United States Patent [19]

Russ

[11] Patent Number: 4,641,544

[45] Date of Patent: Feb. 10, 1987

[54] MOTION TRANSMITTING AND TIMING MECHANISM

[75] Inventor: David E. Russ, Rockford, Ill.

[73] Assignee: Sundstrand Corporation, Rockford, Ill.

[21] Appl. No.: 787,316

[22] Filed: Oct. 15, 1985

[51] Int. Cl.[4] .................................... F16H 55/02

[52] U.S. Cl. .................................... 74/435; 74/425; 74/405

[58] Field of Search ................. 74/405, 434, 435, 439, 74/425, 89.15

[56] References Cited

U.S. PATENT DOCUMENTS

| | | | |
|---|---|---|---|
| 792,572 | 6/1905 | Deeley et al. . | |
| 1,696,049 | 12/1928 | Miller . | |
| 1,748,390 | 2/1930 | Otto . | |
| 1,833,644 | 11/1931 | Haegele . | |
| 2,304,960 | 12/1942 | Schane . | |
| 2,844,038 | 7/1958 | Danta | 74/425 |
| 2,907,098 | 10/1959 | Kendall | 74/435 |
| 3,220,278 | 11/1965 | Miller . | |
| 3,260,128 | 7/1966 | Gassino et al. . | |
| 3,408,021 | 10/1968 | Nichols . | |
| 4,003,267 | 1/1977 | Busch . | |
| 4,090,410 | 5/1978 | Nakamura . | |
| 4,310,087 | 1/1982 | Gawler . | |

FOREIGN PATENT DOCUMENTS

| | | | |
|---|---|---|---|
| 84514 | 6/1921 | Fed. Rep. of Germany | 74/435 |
| 509558 | 9/1930 | Fed. Rep. of Germany | 74/435 |

*Primary Examiner*—Richard J. Scanlan, Jr.
*Assistant Examiner*—Joseph A. Fischetti
*Attorney, Agent, or Firm*—Wood, Dalton, Phillips, Mason & Rowe

[57] ABSTRACT

A motion transmitting and timing mechanism including an input gear 36, a timing gear 44 rotatable about an axis 50 and meshed with the input gear 36, and an output gear 64 rotatable about the axis 50 and shiftable along the axis into positions in and out of a plane including the input gear 36. The output gear 64 has a toothed sector 66 and an untoothed sector and a spring 76 and detent 72 arrangement normally maintain the untoothed sector in axial alignment with the input gear 36. A threaded connection 46, 70 between the timing gear 44 and the output gear 64 effects axial movement of the output gear 64 upon relative rotation between the two and a jaw 82 carried by the timing gear 44 is engageable with the output gear 64 for moving the toothed sector 66 into mesh with the input gear 36.

10 Claims, 3 Drawing Figures

MOTION TRANSMITTING AND TIMING MECHANISM

FIELD OF THE INVENTION

This invention relates to a motion transmitting mechanism which additionally incorporates a timing function.

BACKGROUND OF THE INVENTION

In a number of mechanical systems, as, for example, door actuating systems, there is a need for some sort of a drive to provide a motion input to part of the system to cause some sort of predetermined movement which must be precisely followed by some differing form of movement. For example, in a door actuation system as mentioned previously, a drive unit may be utilized to first move the door from an opened position to a closed position at which time a hook or a latch is operated to latch the door in the closed position.

Subsequently, when the door is to be opened, the drive unit is operated to first release the latch and then move the door from the closed position to the open position.

While these sequential functions can be performed by any of a variety of means including electrical or electronic control circuits, in some instances, it is desirable to accomplish them mechanically with a simple and reliable mechanism which provides for both the transmission of motion from a drive unit to a work piece such as a door latching system and the timing of the motion transmission, that is, the transmission of the motion only at a predetermined time during an operational cycle of the system in which the mechanism is utilized.

The present invention is directed to the provision of such a mechanism.

SUMMARY OF THE INVENTION

It is the principal object of the invention to provide a new and improved motion transmitting and timing mechanism. More specifically, it is an object of the invention to provide such a mechanism which is simple and reliable.

An exemplary embodiment of the invention achieves the foregoing object in a mechanism including an input gear. A timing gear is rotatable about an axis and is meshed with the input gear. An output gear is rotatable about the axis and is shiftable along the axis into positions in and out of a plane including the input gear. The output gear has a toothed sector and an untoothed sector. Means are provided for normally maintaining the untoothed sector in axial alignment with the input gear and there are means responsive to rotation of the timing gear for axially moving the output gear between its positions. The mechanism includes means operated by the timing gear and engageable with the output gear when the output gear is in the previously mentioned plane for moving the toothed sector into mesh with the input gear. Upon such occurrence, the output gear will be driven to effect motion transmission. At the same time, timing is accomplished in that a certain amount of rotation of the timing gear is required before the output gear is moved into the plane whereat it can be engaged with the input gear.

In a preferred embodiment, the input gear is a worm and the output gear is a sector gear.

The invention contemplates that the responsive means comprise a threaded connection between the timing gear and the output gear.

The invention also contemplates the provision of an output lever pivoted about the rotational axis of the timing gear and the output gear, with the output gear having a splined connection to the lever.

In a highly preferred embodiment, a spring and a stop cooperate together to normally maintain the untoothed sector in axial alignment with the input gear and the spring additionally serves to resist rotation of the output gear. Thus, when a threaded connection interconnects the output gear and the timing gear, rotation of the timing gear relative to the output gear will normally occur due to the resistance to rotation of the output gear provided by the spring to consequently effect the axial movement of the output gear.

The invention also contemplates that the mechanism be utilized in a closure system including a door moveable between open and closed positions and having latch means for latching the door in the closed position as well as a motor for moving the door between the positions. In such a system, the motor is coupled to the worm and the output gear is coupled to the latching means.

Other objects and advantages will become apparent from the following specification taken in connection with the accompanying drawings.

DESCRIPTION OF THE PREFERRED EMBODIMENT

Figure 1:
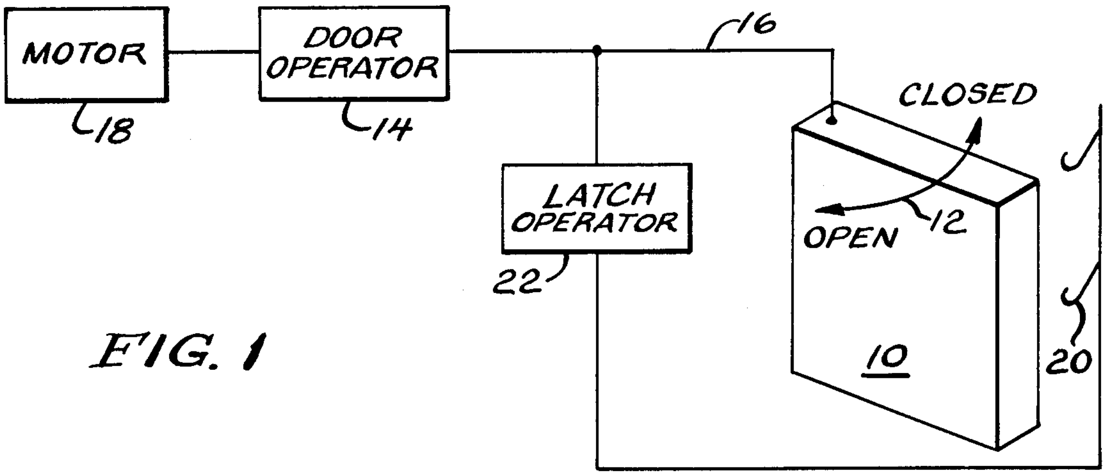
FIG. 1 is a schematic of a system in which a mechanism made according to the invention may be employed as a latch operator.

One environment of intended use of a motion transmitting and timing mechanism made according to the invention is illustrated in FIG. 1 in the form of a door actuation system. In particular, there is provided a door 10 which may be moved between open and closed positions as indicated by an arrow 12. To move the door 10 between such positions, there is provided a door opener 14 connected by any suitable linkage such as shown schematically at 16 to the door 10. A bi-directional motor 18 is adapted to drive the door operator 14. Depending upon which direction the motor 18 is operated, the door 10 will either open or close.

The system also includes one or more latches 20 that are mounted for movement to latch the door 10 in a closed position. To drive the latches 20, the timing and motion transmitting mechanism of the invention is employed as a latch operator 22. The same is driven by the output of the door operator 14 or, if desired, by the motor 18 itself. In either event, in the system illustrated, the mechanism of the invention is adapted to time the operation of the latches 20 and cause their operation through motion transmission at predetermined points in an operational cycle.

For example, if the door 10 is in an opened position, the motor 18 may be energized in one direction to initiate operation of the door operator 14 which will in turn cause the door 10 to begin to move towards a closed position. This actuation will also be applied to the latch operator 22 which will be in a timing mode of operation but not a motion transmitting mode of operation.

At some predetermined point in the operation of the system, the door 10 will be in a closed position and the latch operator will enter its motion transmission mode to cause the latches 20 to latch the door 10.

When the motor 18 is operated in the reverse direction to move the door 10 from the closed position to the open position, initially the latch operator will be in a motion transmitting mode causing the latches 20 to release from the door 10. After that has occurred, the latch operator 22 will revert to a timing mode which essentially acts to reset the mechanism to an initialized position when the door reaches its fully opened position.

Figure 2:
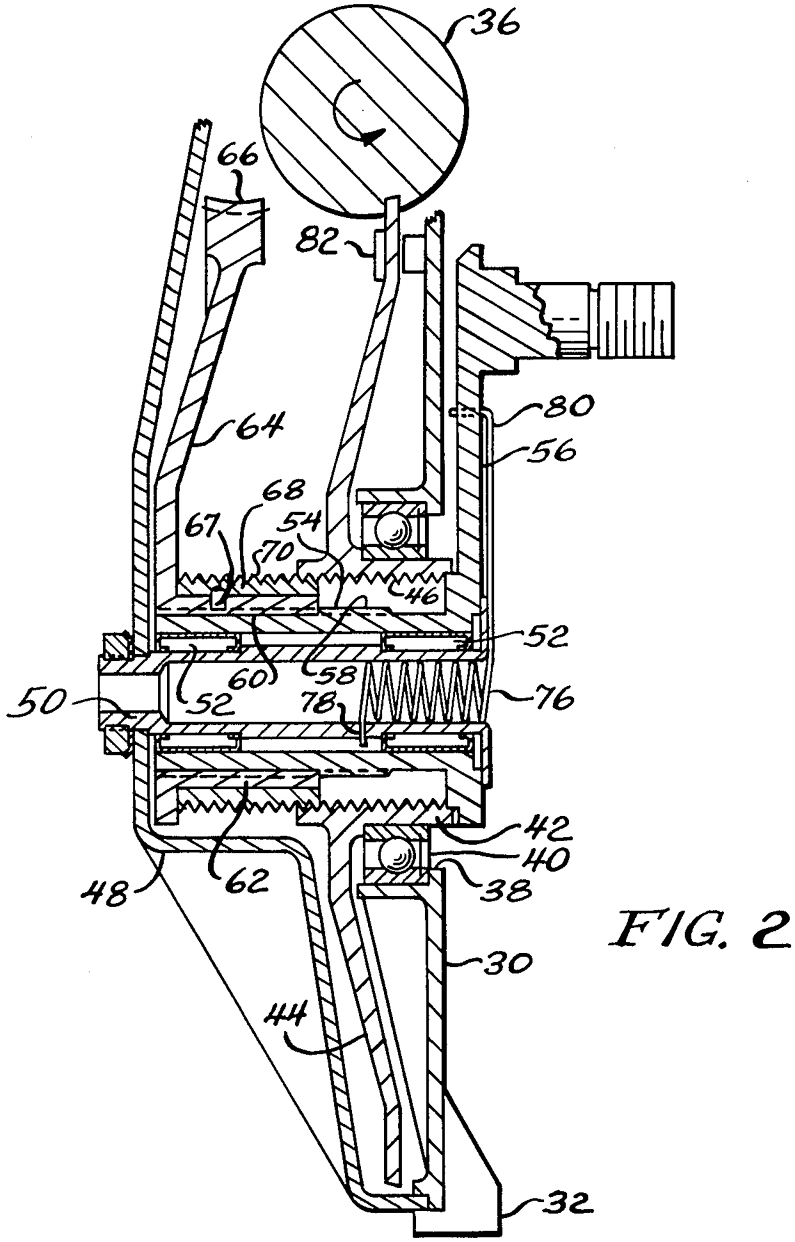
FIG. 2 is a sectional view of the inventive mechanism.
Figure 3:
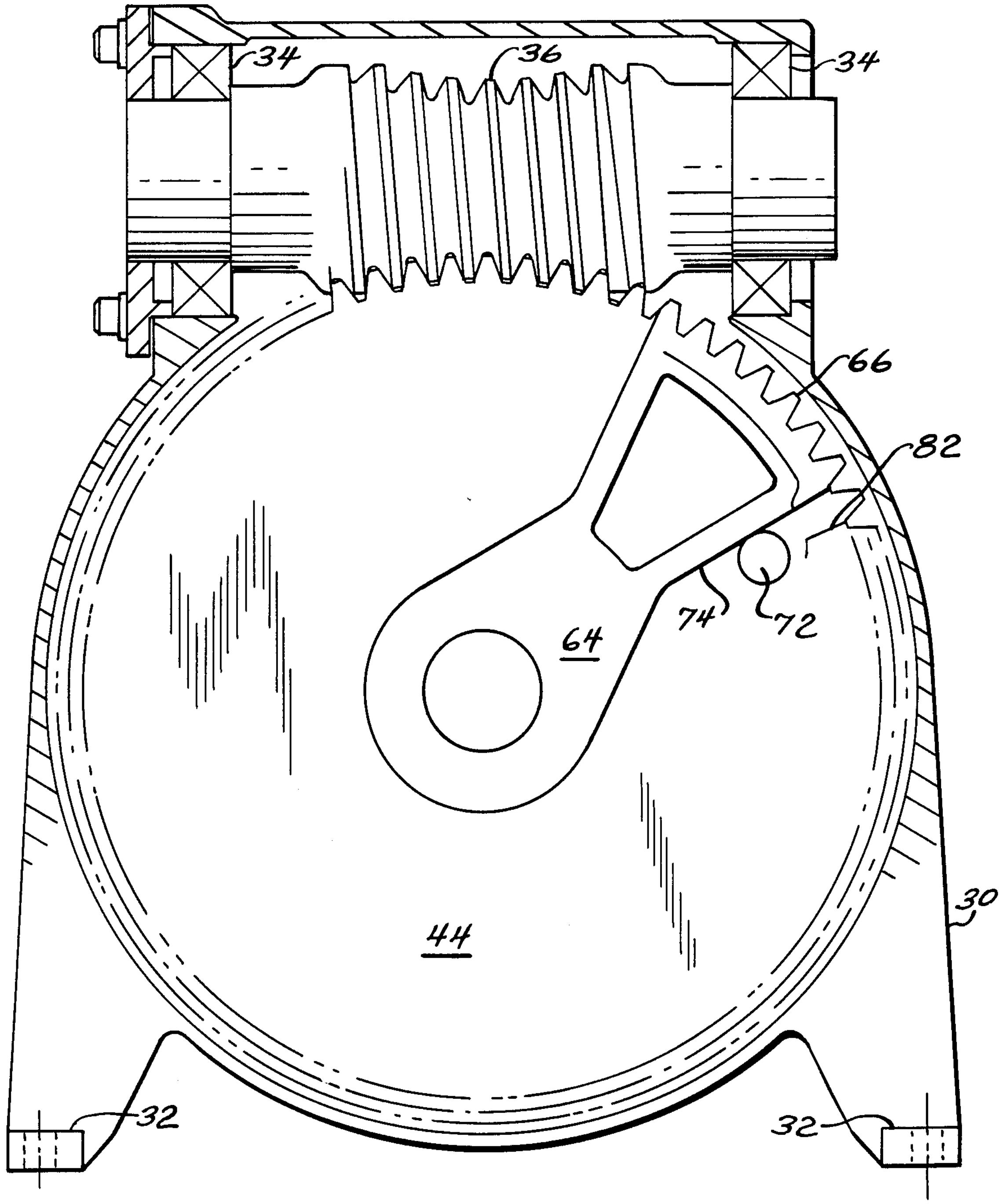
FIG. 3 is a view of the mechanism taken from the left of the view in FIG. 2 and with certain components removed for clarity.

Turning now to FIGS. 2 and 3, the mechanism of the invention will be described in greater detail. The same may include a mounting bracket 30 having feet 32 securable to a wall or the like. At the upper end of the mounting bracket 30, bearings 34 are provided to journal a worm 36 of conventional construction which serves as an input gear. The worm 36 is thus to be coupled to the motor 18, either directly or via the door operator 14, as desired.

As best seen in FIG. 2, the bracket 30 includes a central opening 38 which receives a bearing 40. The bearing 40, in turn, journals the hub 42 of a timing gear 44 which is meshed with the worm 36. For purposes to be seen, the interior of the hub 42 is threaded as at 46.

A cap-like element or cover plate 48 acts in conjunction with the bracket 30 to define a housing for the mechanism component and, in addition, stationarily mounts a shaft 50 which is on the axis of rotation of the timing gear 44. By means of bearings 52, the shaft 50 journals the hollow shaft 54 forming one end of an output lever 56. The output lever 56 may be connected by any suitable linkage (not shown) to the hooks 20.

The shaft 54 of the lever 56 has exterior splines 58 which slidably mate with interior splines 60 in the hub 62 of a sector gear 64. As seen in FIG. 3, the sector gear 64 includes a toothed segment 66 of approximately 30°, the remaining 330° about the sector gear 64 being untoothed. However, depending upon the actual application and the timing sequence required, the toothed sector 66 could occupy a greater or a lesser number of degrees.

On the exterior of the hub 62, and pinned thereto by means of a pin 67, is an externally threaded sleeve 68 having threads 70 engaged with the threads 46 on the interior of the timing gear hub 42.

As a result of this configuration as well as the presence of the interengaging splines 58 and 60, it will be appreciated that when the timing gear 44 is rotated, if the sector gear 64 does not rotate therewith, it will slide on the splines axially along the lever shaft 54 as the threads 70 advance into or out of the threads 46.

The cover plate 48 includes a generally axially extending finger 72 which, as seen in FIG. 3, is adapted to abut the sector gear 64 on a side 74 thereof. A coil spring 76 has one end 78 affixed to the stationary shaft 50 and its opposite end 80 secured to the lever arm 56. The arrangement is such that a spring bias is applied to the lever arm 56, and thus to the lever shaft 54 and the sector gear 64 engaged therewith to bias the sector gear 64 into engagement with the finger 72 which then serves as a detent. By thus biasing sector gear 64, the spring 76 cooperates with the finger 72 to resist rotation of the sector gear 64 and to normally place the untoothed sector of the gear 64 in axial alignment with the worm 36. As a consequence of such resistance, the aforementioned axial movement of the sector gear 64 toward or away from the timing gear 44 will occur.

As seen in FIGS. 2 and 3, near its periphery, at one location thereon, the timing gear 44 carries a lateral projection or jaw 82. As can be appreciated from FIG. 2, the jaw 82 normally will be in no position to engage the sector gear 64, being axially spaced therefrom. However, when relative rotation between the timing gear 44 and the sector gear 64 has occurred to a sufficient extent as to cause the sector gear 64 to be advanced to the right as viewed in FIG. 2 so as to be within a plane nominally defined by the worm 36 and the timing gear 44, the jaw 82 will be in a position as to be engageable, under continued rotation of the timing gear 44, with the side 74 of the sector gear 64. When such engagement incurs, continued rotation of the timing gear 44 will drive the sector gear 64 into engagement with the worm 36 and the latter will then drive the former. Such motion of the sector gear 64 will be, of course, be transmitted to the lever 56 by reason of the splined connection between the two. Thus, such movement may be utilized to engage the latches 20 as mentioned previously.

Once the latches 20 are fully engaged, the drive or motor 18 will typically stall or can be turned off by other means such as limit switches. In any event, at such time, the sector gear 64 will be engaged with the worm 36.

When it is desired to reverse operation of the system, the motor 18 is driven in the opposite direction resulting in the worm 36 driving the sector gear 64 in a clockwise direction as viewed in FIG. 3. Ultimately, sector gear 64 will disengage from the worms 36 and, under the bias of the spring 76, revert to the position illustrated in FIG. 3. Continued operation of the motor 18 will result in the sector gear 64 moving axially to the left as viewed in FIG. 2 until the original starting position is achieved.

It is to be noted that the location of the jaw 82 is such that the gear

The mechanism, in its timing mode, consumes very little energy since all that is occurring is idle rotation of the timing gear 44 and relatively slow axial movement of the sector gear 64. However, when the mechanism has timed out, a high torque is provided to the lever 56 which ideally suits the mechanism for utilization in a door actuation system where large forces may be required to operate the latches.

The mechanism is of simple construction and, as a consequence, highly reliable.

I claim:

1. A motion transmitting and timing mechanism comprising;

an input gear;

a timing gear rotatable about an axis and meshed with said input gear;

an output gear rotatable about said axis and shiftable along said axis into position in and out of a plane including said input gear, said output gear having a toothed sector;

means normally maintaining said toothed sector out of axial alignment with said input gear;

means responsive to rotation of said timing gear for axially moving said output gear between said positions; and means operated by said timing gear and engageable with said output gear when said output gear is in said plane for moving said toothed sector into mesh with said input gear.

2. The motion transmitting and timing mechanism of claim 1 wherein said input gear is a worm and said output gear is a sector gear.

3. The motion transmitting and timing mechanism of claim 1 wherein said responsive means comprises a threaded connection between said timing gear and said output gear.

4. The motion transmitting and timing mechanism of claim 1 including an output level pivoted about said axis, said output gear having a splined connection to said lever.

5. A mechanism comprising;

a worm adapted to be bi-directionally driven;

a timing gear having teeth about its entire periphery rotatable about an axis and meshed with said worm, said timing gear having an internally threaded hub;

a sector gear rotatable about said axis and having an externally threaded hub engaged with said timing gear hub so that relative rotation between said timing and sector gears will move said sector gear along said axis, said sector gear hub further including axial splines;

an output shaft having axial splines engaged with said axial splines on said sector gear hub;

a detent engageable by said sector gear for limiting rotational movement thereof in one direction;

a spring biasing said sector gear toward said detent; and a jaw carried by said timing gear and engageable with said sector gear to cause the same to rotate in unison with said timing gear against the bias of said spring to drive said sector gear into engagement with said worm for one direction of rotation of said worm.

6. The mechanism of claim 5 wherein said sector gear and said detent are constructed and arranged such that said sector gear cannot engage said worm when said sector gear is engaging said detent.

7. The mechanism of claim 6 wherein said output shaft is disposed about a stationary shaft and said spring is disposed between and interconnects said stationary shaft and said output shaft.

8. A closure system including the mechanism of claim 5 and further comprising a door movable between open and closed positions; latch means for latching said door in said closed position and a motor for moving said door between said positions; said motor further being coupled to said worm and said output shaft being coupled to said latching means.

9. A motion transmitting and timing mechanism comprising;

an input gear;

a timing gear rotatable about an axis and meshed with said input gear;

an output gear rotatable about said axis and shiftable along said axis into position in and out of a plane including said input gear, said output gear having a toothed sector;

a spring and a stop cooperating to normally maintain said toothed sector out of axial alignment with said input gear, said spring further resisting rotation of said output gear in one direction;

a threaded connection between said gears and responsive to rotation of said timing gear relative to said output gear for axially moving said output gear between said position; and a jaw on said timing gear and engageable with said output gear when said output gear is in said plane for moving output gear against said spring to bring said toothed sector into mesh with said input gear.

10. The motion transmitting and timing mechanism of claim 9 wherein said input gear is a worm.

* * * * *